C. UEBELMESSER.
MOTION PICTURE CAMERA.
APPLICATION FILED MAR. 11, 1915.
1,291,277.
Patented Jan. 14, 1919.
2 SHEETS—SHEET 1.
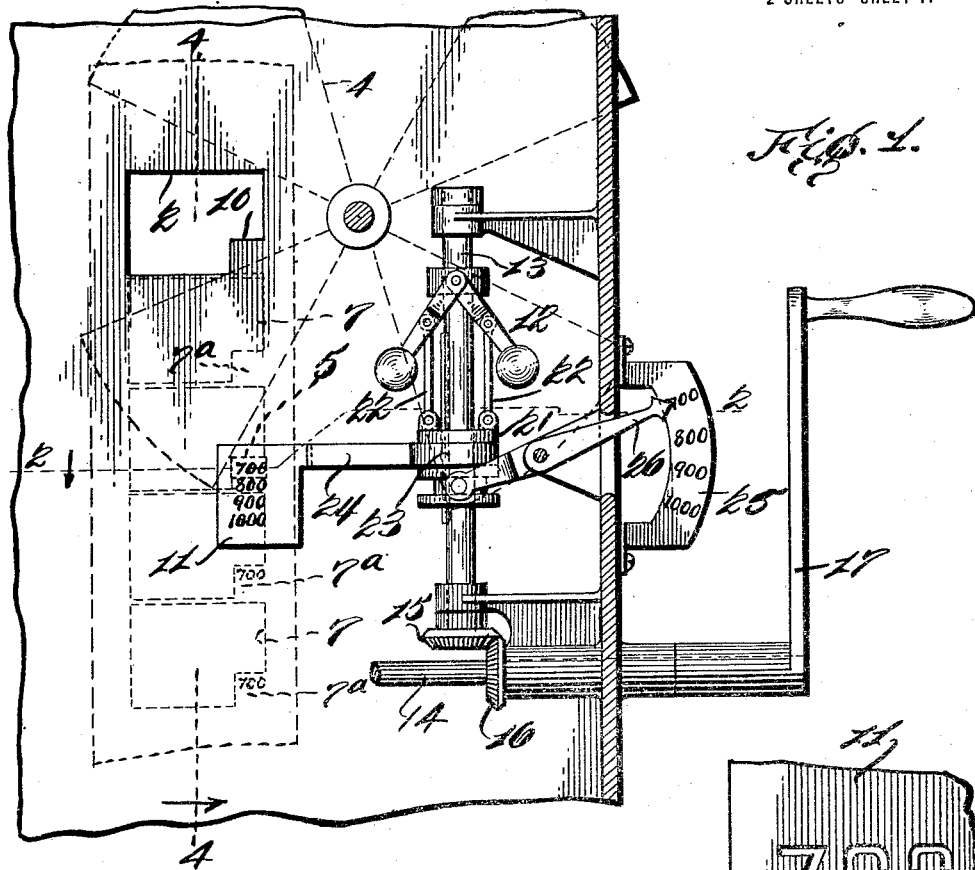
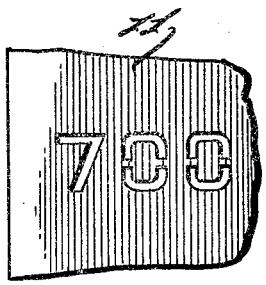
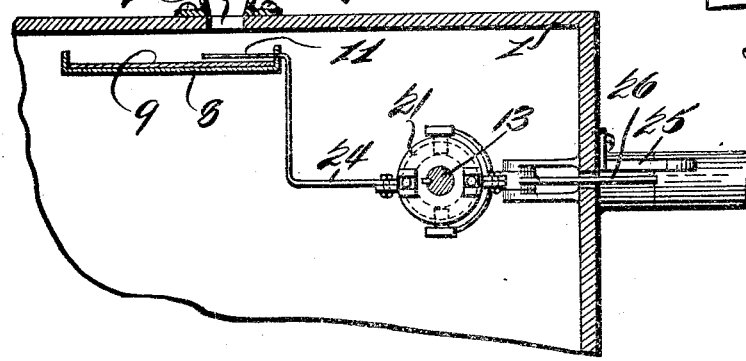

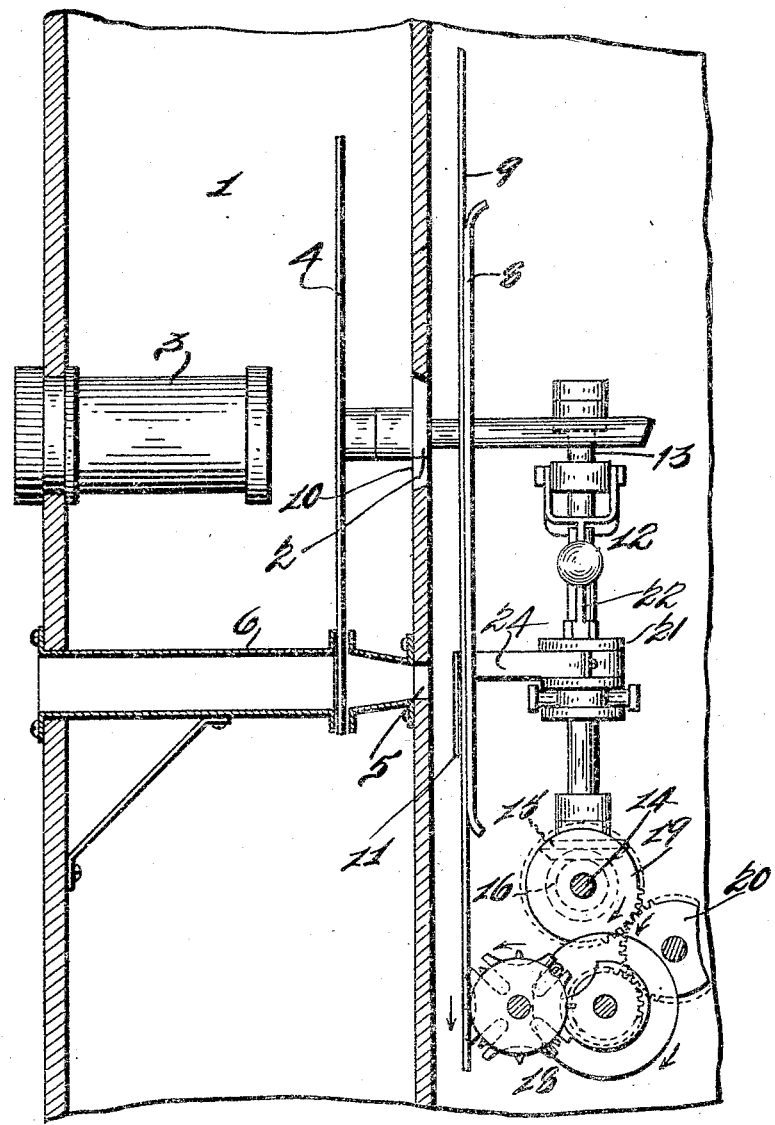

UNITED STATES PATENT OFFICE.

CHARLES UEBELMESSER, OF NEW YORK, N. Y., ASSIGNOR TO CRU PATENTS CORPORATION, A CORPORATION OF NEW YORK.

MOTION-PICTURE CAMERA.

1,291,277.  Specification of Letters Patent.  Patented Jan. 14, 1919.

Application filed March 11, 1915. Serial No. 13,819.

*To all whom it may concern:*

Be it known that I, CHARLES UEBELMESSER, a subject of the Emperor of Germany, residing at New York city, county and State of New York, have invented certain new and useful Improvements in Motion-Picture Cameras, of which the following is a full, clear, and exact description.

This invention relates to the art of taking motion pictures and pertains particularly to cameras designed for that purpose. The object of this invention is to provide a motion picture camera equipped with means whereby the speed of the film can be recorded thereupon.

To obtain the best results in reproduction, a motion picture film should be driven by the kinetoscope mechanism, at the same speed that the picture was taken.

To obtain this end I provide means to record the speed of the film preferably while the picture is being taken. To record the speed of the film, I preferably photograph upon the film the number of pictures per minute that are being taken, simultaneously with the photographing of the scene.

In the drawings which form part of this specification

Figure 1 is a fragmentary sectional view of a motion picture camera embodying my improvement;

Fig. 2 is a sectional plan view thereof, the section being taken on a line 2—2 in Fig. 1;

Fig. 3 is an enlarged fragmentary detail view of a portion of the stencil plate forming part of my invention, and Fig. 4 is a vertical sectional view, the section being taken on a line 4—4 in Fig. 1.

In the drawings a camera casing is indicated by 1, the said casing being provided with the usual orifice 2 and lens 3, the usual shutter 4 being also provided.

In connection with my improvement, I provide the casing 1 preferably with an auxiliary opening 5, the said opening 5 being in alinement with a light tube 6 carried by the casing 1. The shutter 4 passes between the lens 3 and tube 6 and openings or orifices 2 and 5 as shown in Fig. 4. The said shutter being arranged to screen both of said openings 2 and 5 at the same time as can be seen by referring to Fig. 1, although in said figure, the openings are illustrated as uncovered. The openings 2 and 5 are spaced apart equal to the distance between, in this instance, three pictures. The spaces occupied by said pictures are illustrated by 7.

The camera casing 1 is also provided with the usual backing plate 8 for the film 9.

The chief object of this invention is to photograph upon the film 9 a record of the number of pictures taken per minute. As will be seen in Fig. 1, the record of the number of pictures per minute, which in this instance is illustrated by 700, is photographed upon the film in one corner of the picture space. To preserve a space for the recording, I place in one corner of the orifice 2 a stop or screen 10. After a picture has been taken, there will be a blank or unexposed portion $7^a$ of the picture space in line with the screen or stop 10. After the film 8 has been moved down, in this instance, three spaces or steps, the unexposed portion of the picture will aline with the auxiliary opening 5 in alinement with which there will be a numeral produced by cutting out a plate 11 which I will term a stencil plate. The plate 11 carries a plurality of such numerals as shown in Fig. 1, the numerals which will aline with the opening 5 being dependent upon the speed at which the film is being driven. Should the number of pictures be 700 per minute the numeral 700 will aline with the opening 5 and said numeral will be photographed upon the space in the corner of each picture. Each picture upon the film will contain the numeral 700, should that be the number per minute. The light for photographing the record will enter the camera through the light tube 6.

It will be evident from an inspection of Fig. 1, that the stencil plate is movable, in this instance vertically movable, it being moved to cause the proper numeral to aline with the opening 5 by a governor 12 which is carried by a rotatable shaft 13 driven from the operating shaft 14 by gears 15 and 16. The shaft 14 is rotated by a handle 17 and operates the film advancing mechanism, in this instance a Geneva movement indicated by 18, Fig. 4. The shaft 14 is provided with a gear 19 which drives the Geneva movement through an idle gear 20. The governor 12 actuates a slidable collar 21 by means of lines 22. The said collar engages a yoke 23 carried by an arm 24 to which the stencil plate 11 is secured. As can be seen in Fig. 4, the stencil plate 11 is located between the film and opening 5 in the camera casing. While the film is being advanced, by the rotating shaft 14, the governor 12 will draw the stencil plate upwardly in proportion to the speed of the film. Should the number of pictures per minute be 700 or any other number, the governor 12 will cause the proper numeral in the plate 11 to aline with the opening 5. To enable the operator to ascertain the number per minute, I provide an indicating index 25, Fig. 1, and pivotal pointer 26, the said pointer being operated by the governor 12 through the collar 21. By means of the index, the operator can tell the number of pictures taken per minute. When the picture is reproduced by a kinetoscope, the record will also be thrown upon the screen and the reproducing operator will know at what speed to operate his machine.

To reproduce the pictures taken by my improved camera, I prefer to employ a specially arranged kinetoscope which forms the subject matter of a copending application filed Mar. 11, 1915 Serial No. 13,817. It will be apparent from the foregoing description and drawings that the number of pictures that are being taken per minute will be photographed adjacent each picture, the recording of the number per minute being simultaneous with the taking of the pictures. It will also be apparent that the photographed record will be produced upon the screen with the pictures, the record being permanent.

What I claim is:

1. In combination with a motion picture camera, a film advancing device, means to operate same, and means controlled by said film advancing operating means to record upon a film the speed at which it is being advanced.

2. In combination with a motion picture camera, a film advancing device, means to operate same, and means controlled by said operating means for photographing upon the film the speed at which the film is being driven.

3. In combination with a motion picture camera, means to advance a film, means to indicate to the operator the speed at which the film is being driven and means controlled by the operation of the film advancing means to record upon the film the speed at which it is driven.

4. In a motion picture camera provided with a plurality of openings, means to advance a film in alinement with said openings, a lens in alinement with one of said openings, a movable stencil plate provided with a plurality of openings representing numerals, arranged to move in alinement with the other of said openings, and means to operate said stencil plate proportionately to the speed of the film.

5. In a motion picture camera provided with an opening for the taking of pictures, means to advance a film, in line with said opening, means to record upon said film the speed at which it is being driven and a governor actuated by the film advancing mechanism to control the operation of the speed recording mechanism.

6. In a motion picture camera, provided with an opening for the taking of pictures, means to advance a film, means whereby the speed of the film can be recorded thereupon by photography and means actuated by the film advancing mechanism to control the position of the speed recording mechanism relative to the space occupied by the picture upon a film.

7. In a motion picture camera provided with an opening for the taking of pictures, means to advance a film in line with said opening, means to screen a portion of said opening whereby the picture space will have an unexposed portion thereon when a picture is taken, and means controlled by the speed of actuation of the film advancing means to record the speed of the film upon said unexposed portion subsequent to its passage by said opening.

Signed at New York city, N. Y., this 4th day of March, one thousand nine hundred and fifteen.

CHARLES UEBELMESSER.

Witnesses:
R. L. WINDHOLZ,
FRED FRANCIS WEISS.